May 18, 1943. H. PANISSIDI 2,319,432
METER CONSTRUCTION
Filed Aug. 12, 1942
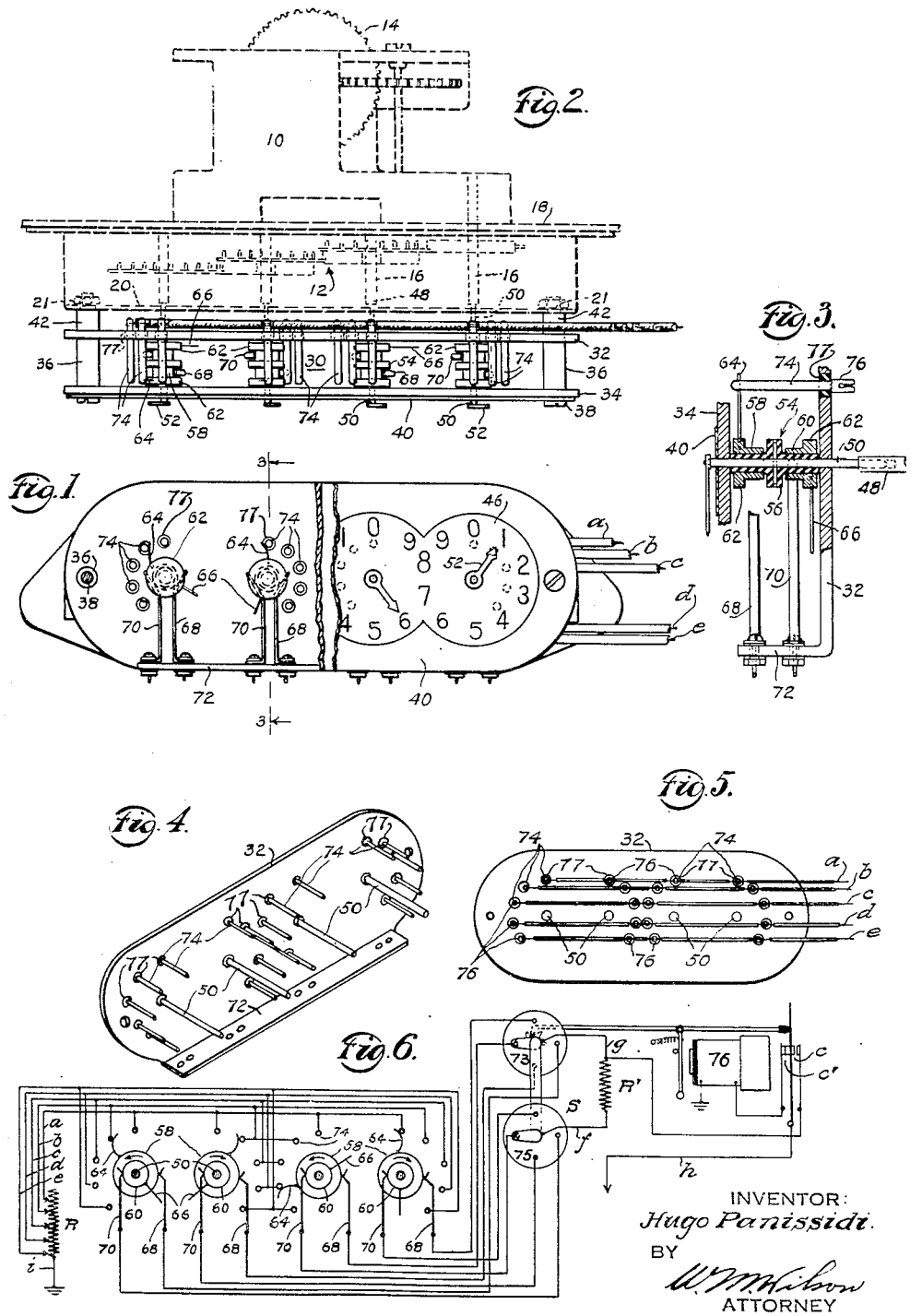
INVENTOR:
Hugo Panissidi.
BY
W. M. Wilson
ATTORNEY Patented May 18, 1943

2,319,432

UNITED STATES PATENT OFFICE 2,319,432

METER CONSTRUCTION

Hugo Panissidi, Jamaica, N. Y., assignor to International Business Machines Corporation, New York, N. Y., a corporation of New York Application August 12, 1942, Serial No. 454,481

2 Claims. (Cl. 200—56)

The present invention relates to indicating instruments and more particularly to an electrical take-off mechanism for such instruments whereby electrical circuits may be successively closed and, upon closing, discriminating apparatus may be controlled thereby to indicate or record at a remote point the reading of the original indicating instrument. The invention is specifically applicable to, and has been designed in connection with, telemetering systems whereby the indication of a dial face cyclometer employing a series of decimally integrated dials having indicating pointers that are moved in step-by-step fashion, and which, therefore, remain unchanged in their positions during the intervals between actuating impulses, is obtained at a central station by a resistance measuring method.

The invention is concerned rather with the specific means whereby the impedance value of a telemetering signaling circuit is altered according to the cyclometer indication than with the manner of discriminating between the various impedance values at the central station, and any one of numerous method of discrimination may be resorted to without altering the electrical take-off mechanism at the cyclometer. If desired, simple, direct observable measurements of the impedance value of the signaling circuit may be made on an ammeter or a more elaborate system of discrimination may be employed without altering the character of the take-off mechanism by means of which the impedance value of the circuit is periodically changed.

The principal object of the invention is to provide a take-off mechanism for dial face cyclometers of the type set forth above, and which are widely employed in the measuring of the volume consumption of electrical current as expressed in watt-hours, which may be manufactured at a very low cost and assembled with ease in an economical manner and the assembled article applied to the cyclometer in the field without necessitating removal of the same from its installation and without requiring special tools. In carrying out this object, the invention contemplates a relatively simple attachment for existing dial face cyclometers in which the various parts thereof may be fashioned by means of simple molding and die stamping operations and assembled by simple pressing operations in a uniform manner and the installation of the assembled article made over the face of the original cyclometer utilizing the original bolt holes ordinarily provided for assembly of the original cyclometer parts.

Another object of the invention is to provide an electrical take-off assembly for cyclometers of the character set forth above in which, although mechanical connection is made to the original pointer dial shafts of the cyclometer, visual reading of the cyclometer may be accomplished in the usual manner.

A further object is to provide such a take-off assembly wherein, although provision is made for the closing of ten separate circuits for each dial face, the necessary space required for wiring purposes is available and wiring may be accomplished with ease and in an efficient manner.

Yet another object is to provide a take-off assembly for dial face cyclometers which is usable in a telemetering system wherein ten different resistances are discriminated and wherein accordingly ten different telemetering circuits are closed, yet in which only six resistor increments are employed for obtaining the ten impedance values.

With these and other objects in view, which will become more readily apparent as the following description ensues, the invention consists in the novel construction, combination and arrangement of parts shown in the accompanying single sheet of drawings, in which:

Fig. 1 is a front elevational view of a cyclometer dial to which the improved take-off mechanism comprising the present invention has been applied.

Fig. 2 is a top plan view of the structure shown in Fig. 1.

Fig. 3 is a sectional view taken substantially along the line 3—3 of Fig. 1.

Fig. 4 is a perspective view of an insulating plate assembly employed in connection with the present invention.

Fig. 5 is a rear view of the plate shown in Fig. 4.

Fig. 6 is a diagrammatic view of the apparatus showing the electrical connections therefor when the same is connected in a telemetering system.

In all of the above described views like characters of reference are employed to designate like parts throughout.

Referring now to the drawing in detail, and particularly to Fig. 2, a portion of a conventional meter is shown at 10 in dotted lines and is provided with the usual dial face cyclometer assembly 12, likewise shown in dotted lines. The meter includes the usual driving gears 14, by means of which the units shaft 16 of the assembly 12 is driven. The units shaft 16 is coupled to the tens, hundreds and thousands shafts of the assembly by means of a well-known veeder arrangement. The cyclometer assembly 12 includes a back-plate 18, to which there is secured a front plate 20 provided with rivet holes 21, by means of which a conventional face plate is ordinarily secured. In the present instance, the face plate is removed by cutting of the usual rivets whereby it is secured to the front plate 20, and this face plate is utilized in the take-off assembly in a manner that will become apparent presently. The various shafts 16 of the veeder arrangement project slightly forwardly of the plate 20 and are adapted ordinarily to receive thereon pointer devices, which also are removed from the assembly and employed in connection with the electrical take-off mechanism comprising the present invention.

The electrical take-off mechanism comprising the present invention is designated in its entirety at 30 and includes a back plate 32 and a front plate 34, the two plates being secured together in spaced relationship by means of spacing sleeves 36 and clamping bolts 38. The bolts 38 pass through the original rivet holes provided in the dial face 40 of the original cyclometer construction and also pass through the front and rear plates 34 and 32 respectively, and spacing sleeves 36, and, in addition, pass through spacing sleeves 42 located rearwardly of the rear plate 32 and finally pass through the rivet holes formed in the front plate 20, thus maintaining the assembly in position with its rear plate 32 spaced slightly forwardly of the front plate 20 of the cyclometer assembly 12.

The dial face 40 is in the form of a relatively thin strip of sheet metal having painted, or otherwise marked on its front surface, the conventional units, tens, hundreds and thousands dial faces which dial faces are designated collectively at 46. Centered through each dial face 46 and projecting completely through the front and rear plates 34 and 32 respectively, and coupled to the units, tens, hundreds and thousands shafts 16 of the veeder assembly as at 48, by means of a friction fit, are a plurality of rotary shafts 50, the forward ends of which project outwardly through the front plate 34 and dial face 40 and have mounted thereon the various units, tens, hundreds and thousands pointers 52, which have been removed from the original meter cyclometer assembly 12. Mounted on each of the shafts 50 (see Fig. 3) and spanning the distance between the front and rear plates 34 and 32 is an insulated sleeve 54 having a central radially extending flange 56. Positioned on either side of the flange 56 is a metallic commutator ring, which rings are insulated from each other and are designated at 58 and 60 respectively. The commutator rings 58 and 60 are each formed with radially extending flanges 62 and a spring contact finger 64 projects laterally from the flange 62 of the commutator ring 58, while a similar contact finger 66 projects laterally from the radially extending flange 62 of the commutator ring 60 on the opposite sides of the shaft 50. A pair of contact brushes 68 and 70 are insulated from, but secured to, a laterally extending flange 72 formed adjacent one edge of the outer plate 40 and the brushes 68 and 70 engage the rings 58 and 60 and are adapted to be connected in a telemetering circuit, as will be described presently.

Referring now to Figs. 3 and 4, the front plate 34 of the assembly 30 is preferably formed of insulating material and in the manufacture of the assembly a plurality of contact pins 74 have their inner ends projecting into and extending through the material of the rear plate 32 of the dial assembly and insulated therefrom by means of insulating bushings 77. The pins 74 are arranged in groups of five pins each, with pins of each group being equally spaced about the circumferential region of the various dial faces 46. Their spacing is such that their positions are correlated with the positions of the first five numerals of the dial, i. e., any two adjacent pins subtend an arc of exactly 36°. The pins 74 are formed with bayonet slot type soldering lugs 76 and the lugs are so oriented as to facilitate wiring together the corresponding pins of each group. Thus, the wire common to the pins in the position of the numeral 0 may be carried to one side of the assembly, as at $a$; the wire common to the pins in the position of the numeral 1 being similarly placed as at $b$; the wires $c$, $d$ and $e$ representing the common leads for the pins in the positions of the numerals 2, 3 and 4, respectively.

Referring now to Fig. 6, for telemetering purposes the wires $a$, $b$, $c$, $d$ and $e$ are connected to varying tap points on a resistor R with the wire $e$ being connected to this resistor at its point of minimum resistance, and the wire $a$ being connected to this resistor at its point of maximum resistance in the telemetering circuit. The contact brushes 68 are each connected to one stationary contact of one level 73 of a two-level phasing switch S, while the contact brushes 70 are similarly connected to the stationary contacts of the other level 75 thereof. The common rotary contact of the level 75 is connected by a wire $f$ to one end of a second resistor R'. The common rotary contact of the level 73 is connected by a wire $g$ to the other end of the resistor R' and this resistor and the wire $g$ are connected through a pair of contacts $c$ to a phasing and reading line $h$, either directly to the central station or to the central station through a suitable secondary selector and primary selector (not shown), by means of which various outlying meter stations may be selected. A delayed action solenoid 76, the winding of which is connected to one end at ground and at the other end through a normally closed pair of contacts $c'$ to the line $h$, serves to control the opening and closing movement of contacts $c$ and $c'$ and also to actuate the two levels of the phasing switch in unison. The resistor R is connected to ground by means of a wire $i$.

During actual meter reading operations, an impulse is sent from the central station over the wire $h$ for the purpose of energizing or pulsing the solenoid through the contacts $c'$. Thereafter, when these latter contacts have become opened and the pair of contacts $c$ have become closed, a reading potential is applied to the line $h$ from the central station and the total overall impedance value of the line may then be discriminated at the central station in any suitable manner. The total impedance value of the reading line in such an instance will, of course, depend upon the various portions of the resistor R which may be in the reading circuit and the fact whether the resistance R' is or is not in the circuit. Introduction of the various resistance values in the circuit is controlled by means of the various flexible contact fingers 64 which selectively engage the various pins 74 located at the peripheral regions of the four dial faces 46. While it would be possible to employ ten of the contact pins 74 equally spaced in the circumferential regions of each dial face, together with a single contact finger common thereto, the arrangement of five such pins and dual fingers affords clearance and facilitates wiring of the apparatus, as previously explained.

The use of the dual contact fingers 64 and 66 necessitates the use of two levels in the phasing switch S. However, phasing operations remain substantially the same as when a single level phasing switch is employed. No claim is made herein to any novelty associated with the phasing switch S and reference may be had to an application for U. S. patent of Ward Leathers, Serial No. 361,802, filed October 18, 1940, for Meter reading apparatus, for a full disclosure of the manner in which the solenoid 76, its contacts $c$ and $c'$ and the two levels 73 and 75 of the phasing switch are actuated to obtain what is known as a pulse and read function, the novelty of this application residing rather in the specific construction of the meter take-off mechanism and the combination of its electrical functions in a telemetering circuit including the phasing switch S.

Where, during the reading of any one of the various dial faces 46, the contact finger 64 rests upon any one of the various contact pins 74, the reading circuit will be established through the line $h$, contacts $c$, line $g$, switch S, brush 70, commutator ring 60, contact finger 66, a portion of the resistance R and line $i$ to ground. The resistor R' will be excluded from the circuit. Where, during a reading of any one of the dial faces 46, the contact finger 64 engages one of the contact pins 74, reading may be obtained through the line $h$, contacts $c$, resistance R', the line $f$, switch S, brush 68, commutator ring 58, contact finger 64, lines $a$, $b$, $c$, $d$ or $e$, as the case may be, all or a portion of the resistance R and line $i$ to ground. Depending upon the combined or additive increments of the resistance, whether including the resistance R' or excluding it, discrimination may take place at the central station to determine the value of overall resistance in the reading circuit. This discrimination may be utilized in any suitable manner to effect a reading or a recording.

In the assembly of the take-off unit 30 in the field, it is merely necessary for the service man or mechanic to remove the usual holding screws in the front panel of the meter 10, after which the panel may be temporarily removed. The holding rivets, by means of which the dial face 40 are ordinarily secured to the front panel 20 of the meter, may then be sheared from their apertures and the original dial face 40 may be centered on the front panel 34 of the take-off unit 30. The bolts 38 may then readily be passed through the front and rear plates 34 and 32, respectively, of the unit 30 and through the usual rivet holes 21, through which the holding screws originally extended. The pointers 52 originally removed from the ends of the shafts 16 may then be applied to the ends of the shafts 50 properly oriented with respect to the dial numerals of the dial face 40. During this installation procedure, the inner ends of the units, tens, hundreds and thousands shafts 16 of the veeder assembly become automatically coupled to the outer ends of the original units, tens, hundreds and thousands shafts, respectively, of the meter 10 by a friction fit, as previously described. After the assembly 30 is in place, the original meter panel may be replaced over the entire front face of the meter, including the assembly 30.

Although the invention has been set forth by illustrating and describing one specific embodiment thereof, it is to be understood that many of the details may be varied without departing from the scope of the invention as defined in the appended claims.

What is claimed is:

1. An attachment for existing meters of the type having a dial face plate, a plurality of rotary dial shafts projecting therethrough in parallelism and a pointer mounted on each shaft, said attachment comprising a front insulated plate and a rear insulating plate spaced therefrom, a plurality of shafts projecting completely through said plates and corresponding in number to the number of said rotary dial shafts and similarly spaced from one another, means on the rear end of each shaft for attachment to one of said rotary dial shafts, means on the front end of each of said shafts for reception of one of said pointers, a commutator ring mounted on each shaft and insulated therefrom and rotatable therewith, a brush carried by one of said plates and in electrical engagement with each commutator ring, a plurality of contact pins projecting outwardly from one of said plates and circumferentially spaced about the axis of each of said shafts, a flexible contact finger extending radially outwardly from each commutator ring and rotatable therewith and designed for successive engagement with their respective contact pins, said brushes and contact pins being designed for electrical connection in a telemetering circuit.

2. An attachment for existing meters of the type having a dial face plate, a plurality of rotary dial shafts projecting therethrough in parallelism and a pointer mounted on each shaft, said attachment comprising a front insulated plate and a rear insulating plate spaced therefrom, a plurality of shafts projecting completely through said plates and corresponding in number to the number of said rotary dial shafts and similarly spaced from one another, means on the rear end of each shaft for attachment to one of said rotary dial shafts, means on the front end of each of said shafts for reception of one of said pointers, a pair of commutator rings mounted on each shaft and insulated therefrom and rotatable therewith, a pair of brushes for each pair of commutator rings carried by one of said plates, a plurality of contact pins projecting outwardly from one of said plates and circumferentially spaced about the axis of each of said shafts, a flexible contact finger extending radially outwardly from each contact ring and rotatable therewith and designed for successive engagement with their respective contact pins, the contact fingers of one contact ring of each pair being diametrically opposed to the other contact finger of the pair, said brushes and contact pins being designed for electrical connection in a telemetering circuit.

HUGO PANISSIDI.